(12) United States Patent
Drescher et al.

(10) Patent No.: US 9,670,955 B2
(45) Date of Patent: Jun. 6, 2017

(54) ANTI-FRICTION BEARING

(71) Applicant: Schaeffler Technologies AG & Co. KG, Herzogenaurach (DE)

(72) Inventors: Thomas Drescher, Wachenroth (DE); Horst Brehm, Bischberg (DE); Martin Kram, Gerolzhofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/912,724

(22) PCT Filed: Jul. 25, 2014

(86) PCT No.: PCT/DE2014/200350
§ 371 (c)(1),
(2) Date: Feb. 18, 2016

(87) PCT Pub. No.: WO2015/039656
PCT Pub. Date: Mar. 26, 2015

(65) Prior Publication Data
US 2016/0208852 A1 Jul. 21, 2016

(30) Foreign Application Priority Data

Sep. 17, 2013 (DE) .......................... 10 2013 218 620

(51) Int. Cl.
*F16C 19/49* (2006.01)
*F16C 19/50* (2006.01)
*F16C 33/36* (2006.01)
*F16C 27/04* (2006.01)
*F16C 41/00* (2006.01)
(Continued)

(52) U.S. Cl.
CPC .............. *F16C 27/04* (2013.01); *F16C 33/34* (2013.01); *F16C 41/002* (2013.01); *F16C 19/49* (2013.01); *F16C 19/54* (2013.01); *F16C 2204/20* (2013.01); *F16C 2326/10* (2013.01)

(58) Field of Classification Search
CPC .......... F16C 19/49; F16C 27/04; F16C 33/34; F16C 33/6696; F16C 33/36; F16C 41/002; H02K 5/173
See application file for complete search history.

(56) References Cited

U.S. PATENT DOCUMENTS

| 5,071,265 A * | 12/1991 | Bowen .................... F16C 19/26 384/494 |
| 5,356,227 A | 10/1994 | Sibley et al. |
| 5,486,052 A | 1/1996 | Sibley et al. |

(Continued)

FOREIGN PATENT DOCUMENTS

| DE | 1045737 | 12/1958 |
| DE | 6906209 | 7/1970 |

(Continued)

*Primary Examiner* — Phillip A Johnson
(74) *Attorney, Agent, or Firm* — Volpe and Koenig, P.C.

(57) ABSTRACT

An anti-friction bearing including a mechanical bearing (2) for transmitting mechanical loads and a potential equalization bearing (3), each rolling element (7) of which has two identical side surfaces. The potential equalization bearing is particularly a ball roller bearing or a cylindrical roller bearing. The potential equalization bearing (3) preferably includes resilient rolling elements (7) in the form of hollow rollers.

14 Claims, 6 Drawing Sheets

(51) Int. Cl.
  *F16C 33/34* (2006.01)
  *F16C 19/54* (2006.01)

(56) References Cited

U.S. PATENT DOCUMENTS

| | | |
|---|---|---|
| 6,102,574 A | 8/2000 | Proschel et al. |
| 6,142,673 A | 11/2000 | Kottritsch et al. |
| 6,755,572 B1 | 6/2004 | Kinbara |
| 8,247,361 B2 | 8/2012 | Shimura et al. |
| 8,556,519 B2 | 10/2013 | Bohr et al. |

FOREIGN PATENT DOCUMENTS

| | | | |
|---|---|---|---|
| DE | 1563954 | 10/1970 | |
| DE | 1980556 | 8/1999 | |
| DE | 19824022 | 12/1999 | |
| DE | 19983988 | 11/2005 | |
| DE | 102004040340 A1 * | 2/2006 | ............. F16C 19/49 |
| DE | 102006035180 | 1/2008 | |
| DE | 102007025467 | 12/2008 | |
| DE | 102007052104 | 6/2009 | |
| DE | 102007062391 | 6/2009 | |
| DE | 102008060957 | 6/2010 | |
| DE | 102010013517 | 10/2010 | |
| EP | 1780011 | 5/2007 | |
| GB | 769485 A * | 3/1957 | ............. C22C 18/04 |
| JP | 2010096207 | 4/2010 | |
| WO | 9100436 | 1/1991 | |
| WO | 2010133462 | 11/2010 | |

* cited by examiner

ANTI-FRICTION BEARING

FIELD OF THE INVENTION

The invention relates to an anti-friction bearing that comprises a main bearing provided for transmitting mechanical loads and also an electrically conductive potential equalization bearing.

BACKGROUND

An anti-friction bearing of the type specified above is known, for example, from DE 198 05 566 B4. This bearing involves an anti-friction bearing for rail vehicles that is constructed from a single-track or multiple-track anti-friction bearing for transmitting the load and a device arranged next to the anti-friction bearing for transmitting electrical current. The device provided for transmitting current is formed, in the case of DE 198 05 566 B4, as an angular-contact anti-friction bearing, in particular, a tapered roller bearing.

As current-conducting elements for anti-friction bearings, seals can also be used that have a conductive inlay. In this context, refer to, for example, DE 10 2007 052 104 A1, DE 199 83 988 B4, and DE 198 24 022 A1.

SUMMARY

The invention is based on the objective of improving a potential equalization device of an anti-friction bearing relative to the specified prior art especially in terms of a compact construction with long-term durability while ensuring constant electrical properties.

This objective is achieved according to the invention by an anti-friction bearing with one or more features of the invention. This anti-friction bearing comprises two anti-friction bearings having a common axis of rotation, namely a main bearing and a potential equalization bearing. The main bearing can be constructed as any anti-friction bearing of known design, for example, as a single-track or multiple-track ball bearing, cylindrical roller bearing, or tapered roller bearing.

The potential equalization bearing is, according to the invention, an anti-friction bearing for which each anti-friction bearing has two equal side surfaces. Such an anti-friction bearing can be constructed, for example, as a cylindrical roller bearing, needle bearing, barrel roller bearing, or ball roller bearing. Ball roller bearings are known, for example, from DE 10 2008 060 957 A1 and from WO 2010/133462 A1. Ball rollers are rolling elements that each have two side surfaces flattened symmetrically from a basic ball shape and arranged parallel to each other. Due to the flattened sections of the rolling elements on the sides, a ball roller bearing is narrower than a ball bearing, whose rolling elements have the same diameter. The surface areas of the rolling elements, as well as raceways that are provided for transmitting current, are not reduced, in contrast, for a ball roller bearing in comparison with a ball bearing with rolling elements of equal diameter. The bearing used as the potential equalization bearing of the anti-friction bearing, in particular, ball roller bearing, is preferably constructed as a single-track radial bearing.

In different constructions of the anti-friction bearing, the main bearing can be either electrically insulated relative to the potential equalization bearing or it can be connected in an electrically conductive way to the potential equalization bearing. Here, in the former case, the bearing rings of the potential equalization bearing are electrically insulated relative to the bearing rings of the main bearing, while in the latter case, at least one bearing ring of the potential equalization bearing is connected in an electrically conductive way to one of the bearing rings of the main bearing. Electrical insulation is selected, for example, in cases in which any current flow through the main bearing must be prevented.

To enable low-resistance current flow through the potential equalization bearing at any time, this bearing is preferably pretensioned. This can be achieved in a simple and reliable way by forming the rolling elements, namely rollers, in particular, ball rollers or cylindrical rollers, of the potential equalization bearing as hollow rollers. This form has the advantage that a large radial play of the main bearing can be equalized by means of the potential equalization bearing, wherein there is only a moderate mechanical load on the potential equalization bearing.

The contacts of the rolling elements of the potential equalization bearing to its bearing rings can be formed, in the case of ball rollers, as rolling elements, in principle, like for a grooved ball bearing. According to one preferred refinement, the potential equalization bearing operating with ball rollers as current-transmitting elements is formed as a four-point bearing. Here, each ball roller of the potential equalization bearing contacts its bearing rings at two points. A ball roller bearing formed as a four-point bearing is known, for example, from DE 10 2006 035 180 A1. This is, for example, a full complement bearing, that is, a bearing without the cage that guides the rolling elements.

The rolling elements of the potential equalization bearing are produced independent of their geometry, preferably from a self-lubricating material. Aluminum-zinc alloys have proven to be especially suitable. The use of aluminum-zinc alloys for anti-friction bearing components is known, in principle, for example, from DE 690 6209 U.

If the potential equalization bearing is operated with a lubricant, an electrically conductive lubricant can be used in all designs. In this context, refer, for example, to EP 0 479 904 B1 and DE 10 2010 013 517 B4 and EP 1 780 011 B1.

While electrical current flowing through the anti-friction bearing flows exclusively or to a large degree only through the potential equalization bearing, forces are transmitted predominantly or almost exclusively via the main bearing. In the case of a common outer ring of the main bearing and the potential equalization bearing, the outer diameter of this bearing ring is preferably somewhat reduced in the area of the potential equalization bearing, in order to prevent unintentional force transfer at this point. In an analogous design, a common inner ring of the main bearing and potential equalization bearing is preferably somewhat widened in the section in which the rolling elements of the potential equalization bearing are arranged.

BRIEF DESCRIPTION OF THE DRAWINGS

Several embodiments of the invention are explained in more detail below with reference to a drawing. Shown herein are.

DETAILED DESCRIPTION OF THE PREFERRED EMBODIMENTS

Parts that correspond to each other or have, in principle, the same function are marked in all of the figures with the same reference symbols.

Figure 1:
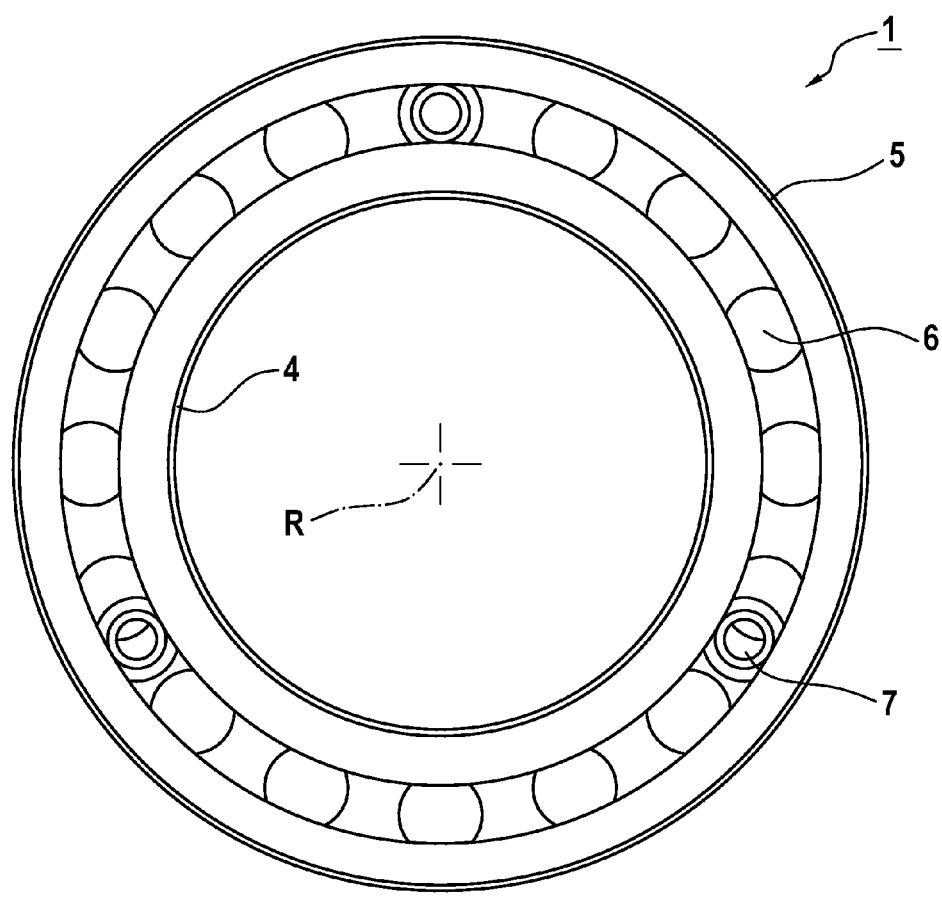
FIG. 1 a first embodiment of an anti-friction bearing having a main bearing and a potential equalization bearing in a top view, FIG. 2 the anti-friction bearing according to FIG. 1 in a sectional diagram, and FIGS. 3-6 sectional diagrams of additional anti-friction bearings with potential equalization.
Figure 2:
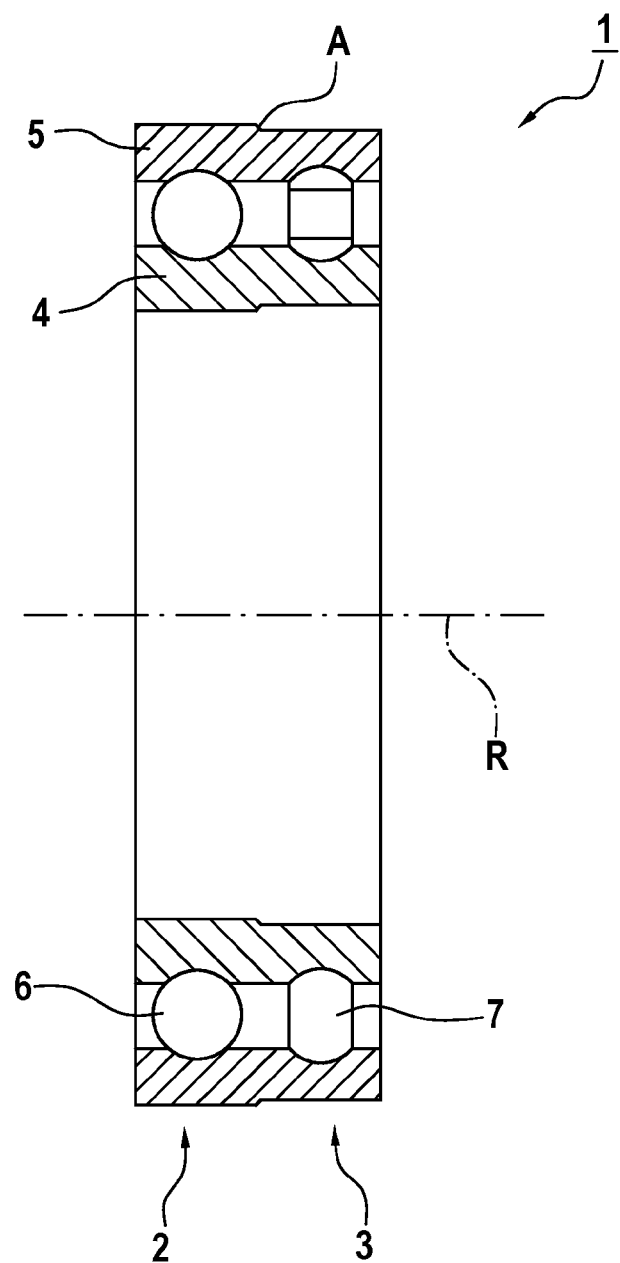
Figure 3:
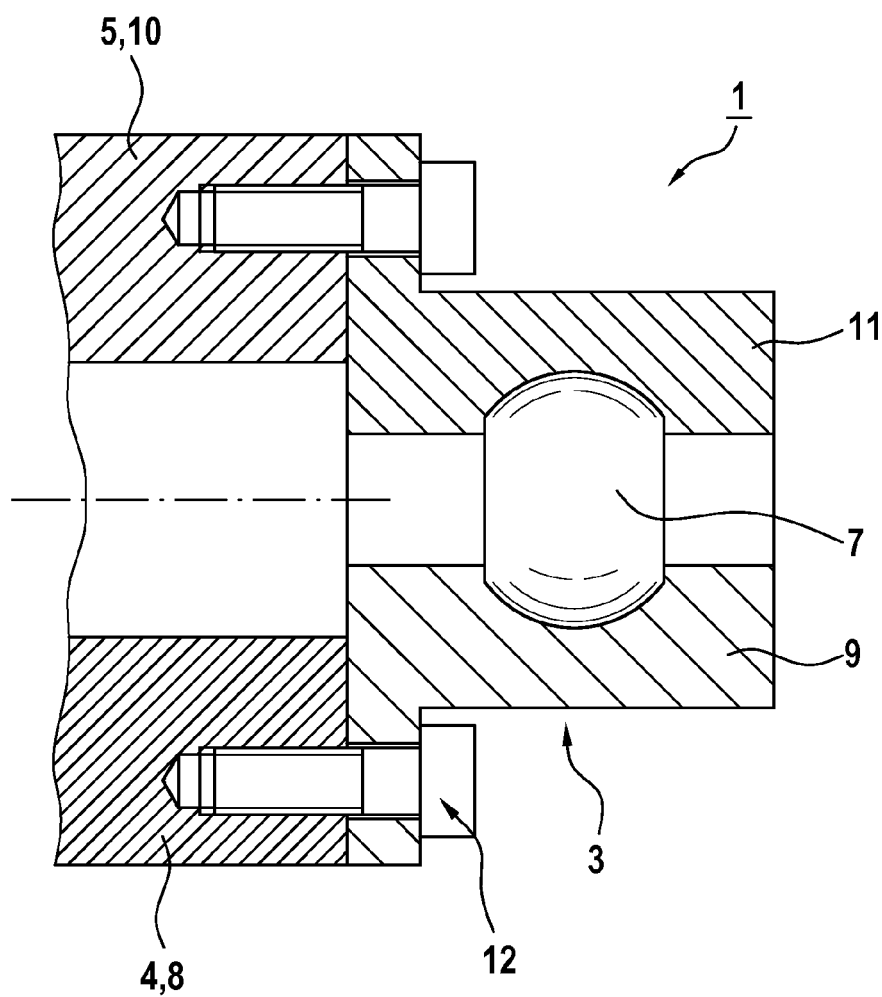
Figure 4:
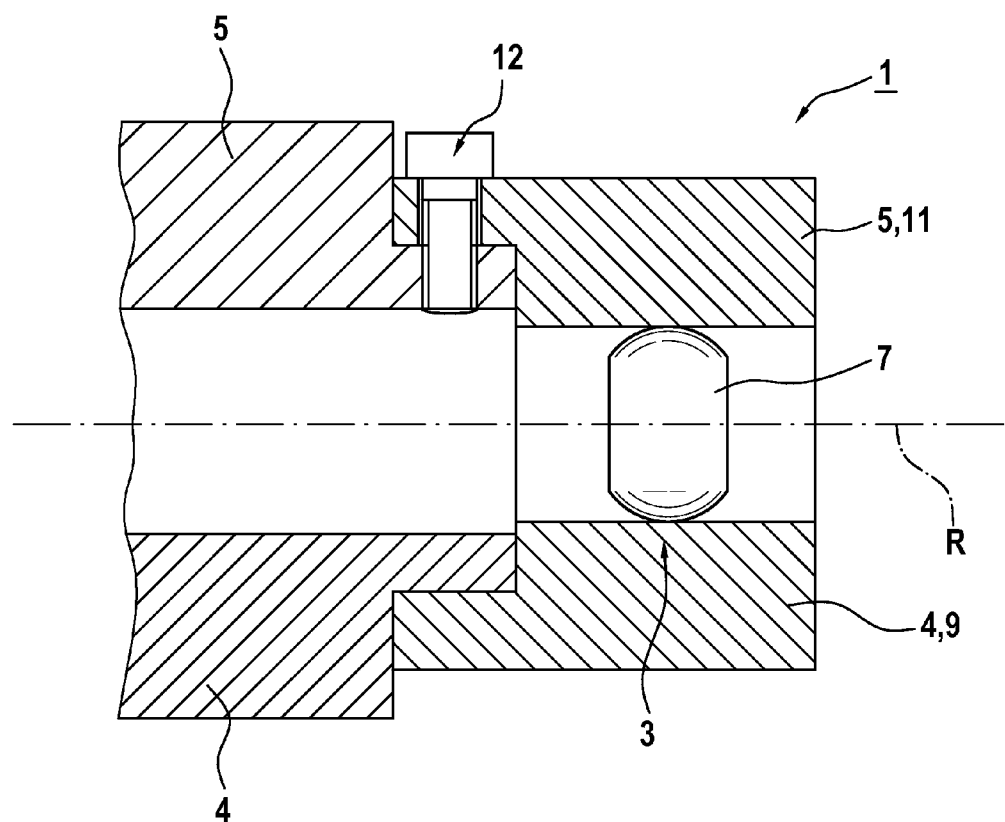

An anti-friction bearing marked overall with the reference symbol 1 in FIGS. 1 and 2 comprises a main bearing 2, namely a ball bearing, and a potential equalization bearing 3, namely a ball roller bearing. The anti-friction bearing 1 is formed overall as a radial bearing; the axis of rotation is marked with R.

In the embodiment according to FIGS. 1 and 2, the anti-friction bearing 1 has a common inner ring 4 and a common outer ring 5. Between the bearing rings 4, 5 roll the rolling elements 6, namely balls, of the main bearing 2, as well as the rolling elements 7, namely ball rollers, of the potential equalization bearing 3. The rolling elements 6 of the main bearing 2 can be guided in a cage. The main bearing 2 could also be formed as a full complement bearing.

In the case shown in FIGS. 1 and 2, the number of anti-friction rolling elements 6 of the main bearing 2 is higher by a multiple than the number of rolling elements 7 of the potential equalization bearing 3. Deviating from this, in the main bearing 2 and in the potential equalization bearing 3, the same number of rolling elements 6, 7 could also be provided. It is also possible that the number of rolling elements 7 of the potential equalization bearing 3 is higher than the number of rolling elements 6 of the main bearing 2.

As can be seen in FIG. 1, the potential equalization bearing 3 has only three ball rollers 7 as rolling elements. Each of these ball rollers 7 is formed as a hollow roller and has a significant degree of elastic flexibility. In contrast to the main bearing 2, which has play in the radial direction, the potential equalization bearing 3 is pretensioned. While the balls 6 of the main bearing 2 are made from typical anti-friction bearing steel, for example, 100Cr6, the rolling elements 7 of the potential equalization bearing 3 is made from an aluminum-zinc alloy. Alternatively, the rolling elements 7 can be made, for example, from steel with an aluminum-zinc coating.

The inner ring 4 of the anti-friction bearing 1 is provided for setting on a shaft; the outer ring 5 is provided for installation in a housing. The not-shown shaft and the similarly not-shown housing have, for this purpose, a cylindrical or slightly conical lateral surface or hole. To prevent a significant force transfer via the rolling elements 7 of the potential equalization bearing 3, the inner diameter of the inner ring 4 is somewhat widened, as can be seen in FIG. 2, in the area of the potential equalization bearing 3 relative to the section in which the main bearing 2 is located. In a similar way, the outer diameter of the outer ring 5 is somewhat reduced in the area of the potential equalization bearing 3 relative to the main bearing 2. A step formed in the lateral surface of the outer ring 5 by the tapering in the area of the potential equalization bearing 3 is marked in FIG. 2 with A.

In the embodiments according to FIGS. 3 to 6, each inner ring 4 is assembled from an inner main bearing ring 8 and an inner auxiliary bearing ring 9, while the outer ring 5 is assembled from an outer main bearing ring 10 and an outer auxiliary bearing ring 11. In the embodiments according to FIGS. 3 and 4, the connection between the main bearing rings 8, 10 and the auxiliary bearing rings 9, 11 is realized by a threaded connection 12 in the axial or radial direction. The rolling elements 6 of the main bearing 2 are not shown in both cases. These can be, for example, cylindrical rollers.

Figure 5:
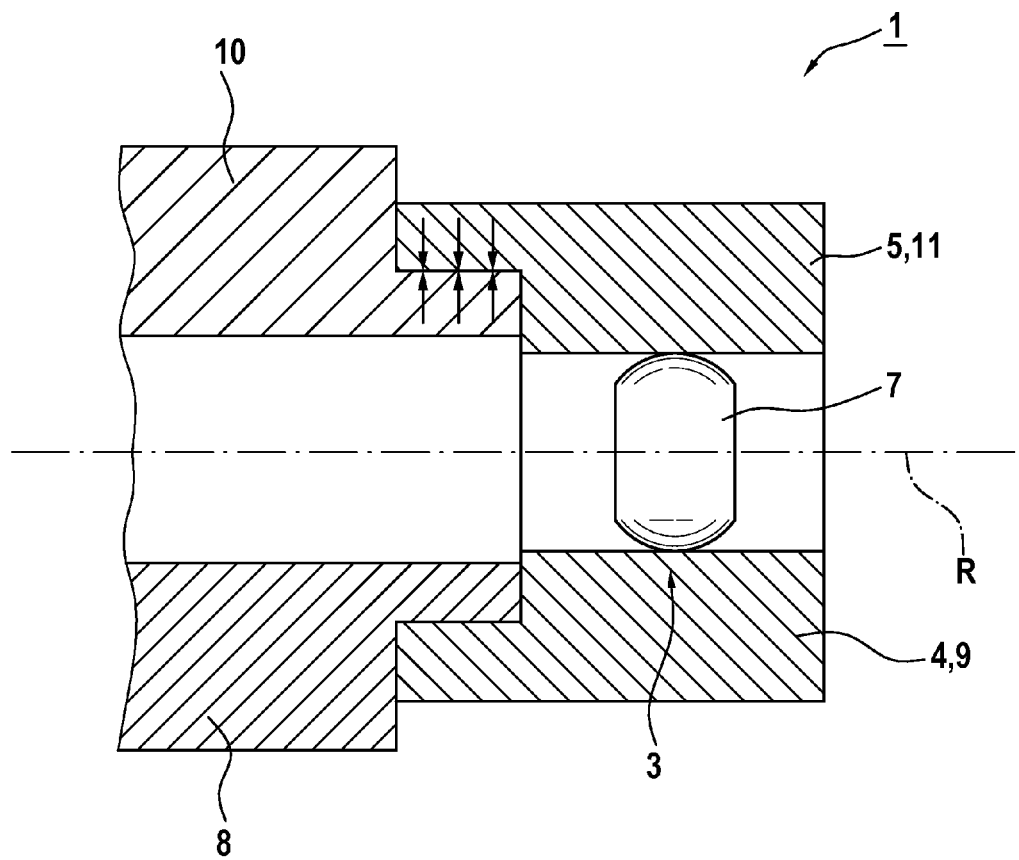

In the embodiment according to FIG. 5, an interference fit assembly between the inner main bearing ring 8 and the inner auxiliary bearing ring 9, as well as another interference fit assembly between the outer main bearing ring 10 and the outer auxiliary bearing ring 11, is produced. In each of the embodiments according to FIGS. 3 to 5, the main bearing ring 8, 10 is connected in an electrically conductive way to the adjacent auxiliary bearing ring 9, 11.

Figure 6:
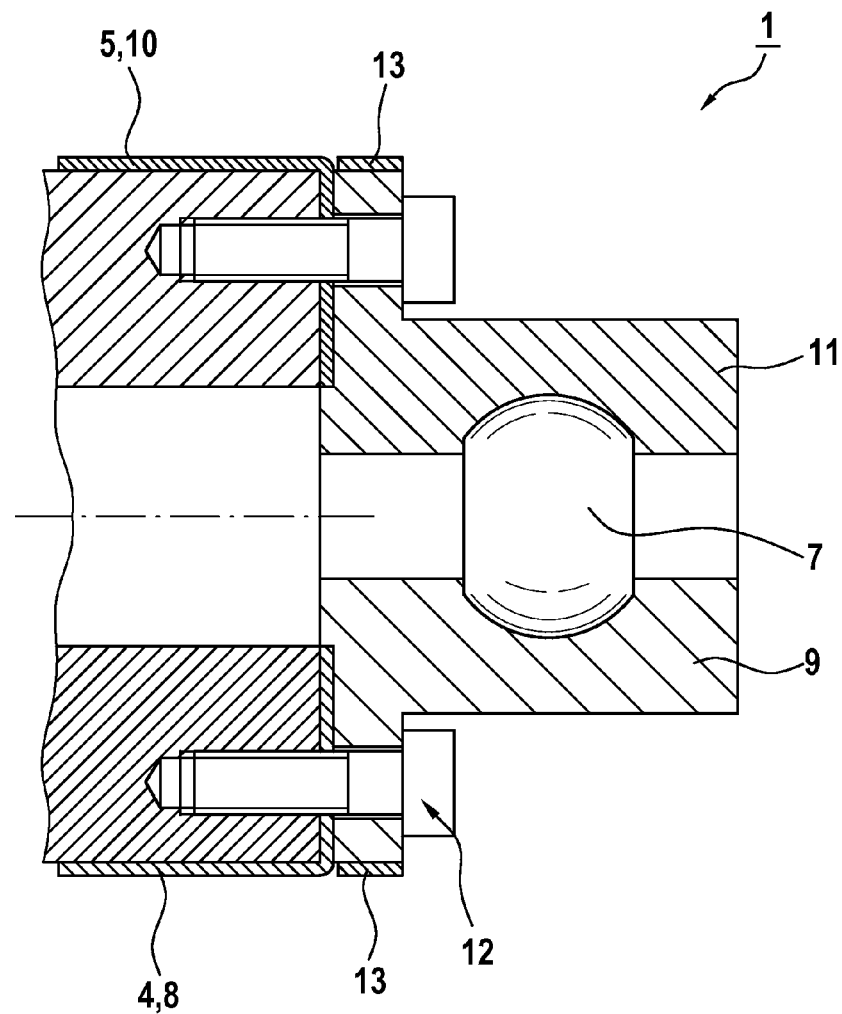

In contrast, in the embodiment according to FIG. 6, each main bearing ring 8, 10 is electrically insulated relative to the adjacent auxiliary bearing ring 9, 11, as is shown by a bold solid line. On the auxiliary bearing rings 9, 11 there are, in the embodiment according to FIG. 6, contacting elements 13 made from electrically conductive materials, such as gold, silver, or copper. A current flow through the main bearing 2 is completely excluded in the embodiment according to FIG. 6.

LIST OF REFERENCE NUMBERS

1 Anti-friction bearing
2 Main bearing
3 Potential equalization bearing
4 Inner ring
5 Outer ring
6 Rolling element, ball
7 Rolling element, ball roller
8 Inner main bearing ring
9 Inner auxiliary bearing ring
10 Outer main bearing ring
11 Outer auxiliary bearing ring
12 Threaded connection
13 Contacting element
A Step
R Axis of rotation

The invention claimed is:
1. An anti-friction bearing, comprising:
a main bearing for transmitting a load, including a plurality of main bearing rolling elements positioned between a main bearing inner ring and a main bearing outer ring; and
a potential equalization bearing adjacent to the main bearing, the potential equalization bearing comprising an anti-friction bearing having a plurality of potential equalization bearing rolling elements that each have two identical side surfaces and which are positioned between a potential equalization bearing inner ring and a potential equalization bearing outer ring, and
wherein an inner diameter of the main bearing inner ring is less than an inner diameter of the potential equalization bearing inner ring such that a first step is formed between the main bearing inner ring and the potential equalization bearing inner ring; and
wherein an outer diameter of the main bearing outer ring is greater than an outer diameter of the potential equalization bearing outer ring such that a second step is formed between the main bearing outer ring and the potential equalization bearing outer ring.
2. The anti-friction bearing according to claim 1, wherein the potential equalization bearing comprises a ball roller bearing.

3. The anti-friction bearing according to claim 2, wherein the potential equalization bearing comprises a four-point bearing.

4. The anti-friction bearing according to claim 1, wherein the potential equalization bearing comprises a cylindrical roller bearing.

5. The anti-friction bearing according to claim 1, wherein the potential equalization bearing is pretensioned.

6. The anti-friction bearing according to claim 5, wherein the rolling elements of the potential equalization bearing are constructed as hollow rollers.

7. The anti-friction bearing according to claim 1, wherein the rolling elements of the potential equalization bearing comprise a self-lubricating material.

8. The anti-friction bearing according to claim 7, wherein the rolling elements of the potential equalization bearing are made from an Al—Zn alloy.

9. The anti-friction bearing according to claim 1, wherein the main bearing and the potential equalization bearing have at least one common bearing ring.

10. The anti-friction bearing according to claim 1, wherein the main bearing outer ring and the potential equalization bearing outer ring are separate components which are attached to each other, and the main bearing inner ring and the potential equalization bearing inner ring are separate components which are attached to each other.

11. The anti-friction bearing according to claim 10, wherein the main bearing outer ring and inner ring are respectively attached to the potential equalization bearing outer ring and inner ring by fasteners.

12. The anti-friction bearing according to claim 10, wherein the main bearing outer ring and inner ring are respectively attached to the potential equalization bearing outer ring and inner ring by an interference fit.

13. The anti-friction bearing according to claim 10, wherein the main bearing outer ring and inner ring are respectively connected to the potential equalization bearing outer ring and inner ring in a manner that allow for electrical conductivity between the main bearing and the potential equalization bearing.

14. The anti-friction bearing according to claim 10, wherein the main bearing outer ring and inner ring are respectively connected to the potential equalization bearing outer ring and inner ring in a manner that electrically insulates the main bearing from the potential equalization bearing.

* * * * *